United States Patent [19]
Uchiyama et al.

[11] 4,181,415
[45] Jan. 1, 1980

[54] CAMERA

[75] Inventors: Takashi Uchiyama, Yokohama; Ryoichi Suzuki, Kawasaki; Tokuichi Tsunekawa; Fumio Ito; Mutsuhide Matsuda, all of Yokohama, Japan; Hiroshi Furukawa, Tokyo, Japan

[73] Assignee: Canon Kabushiki Kaisha, Tokyo, Japan

[21] Appl. No.: 776,479

[22] Filed: Mar. 10, 1977

[30] Foreign Application Priority Data

Mar. 12, 1976 [JP] Japan .................................. 51-27574

[51] Int. Cl.² ...................... G03B 15/05; G03B 17/04; G03B 17/52
[52] U.S. Cl. ..................................... 354/86; 354/145; 354/149; 354/187; 354/193
[58] Field of Search ............... 354/126, 139, 145, 149, 354/187, 83, 84, 85, 86

[56] References Cited

U.S. PATENT DOCUMENTS

| Re. 26,763 | 1/1970 | Hennig et al. | 354/149 |
|---|---|---|---|
| 3,273,479 | 9/1966 | Jakob | 354/149 |
| 3,440,939 | 4/1969 | Peterson et al. | 354/187 |
| 3,682,076 | 8/1972 | Erlichman et al. | 354/202 |
| 4,016,580 | 4/1977 | Finelli | 354/126 |
| 4,054,889 | 10/1977 | Tsujimoto | 354/86 |

*Primary Examiner*—Michael L. Gellner
*Attorney, Agent, or Firm*—Toren, McGeady and Stanger

[57] ABSTRACT

In an instant, self-developing, and folding camera, a built-in flash unit is disabled as long as the camera is folded. According to another aspect, the flash is disabled after each photograph until the feed motor that drives the film during development has completed its operation. A collapsible bellows forms a dark space between first and second housing sections. When the bellows are folded the flash is drawn to the first section by coupling means. When the bellows are extended the coupling means draws the flash into an operative position.

31 Claims, 6 Drawing Figures

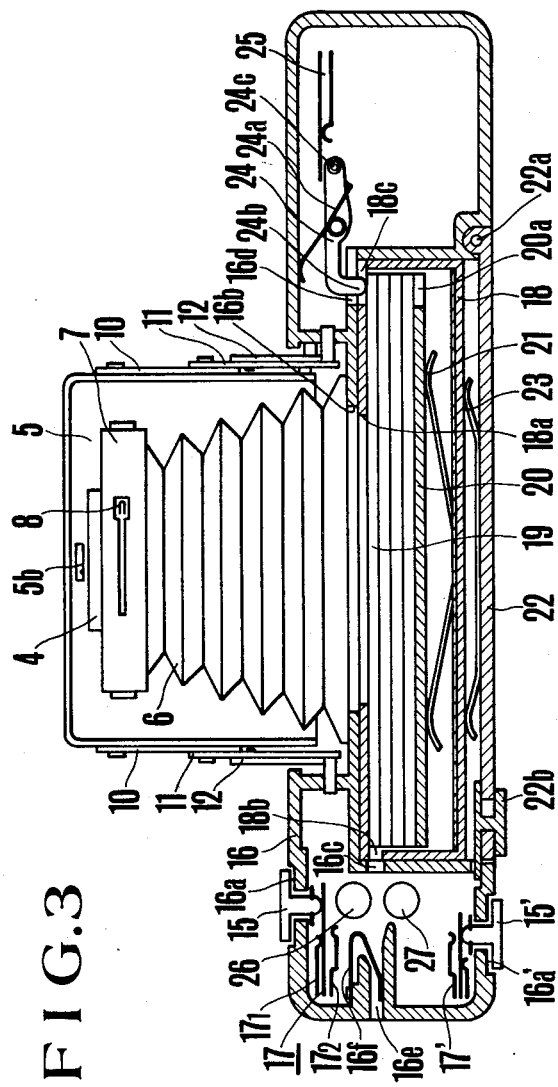
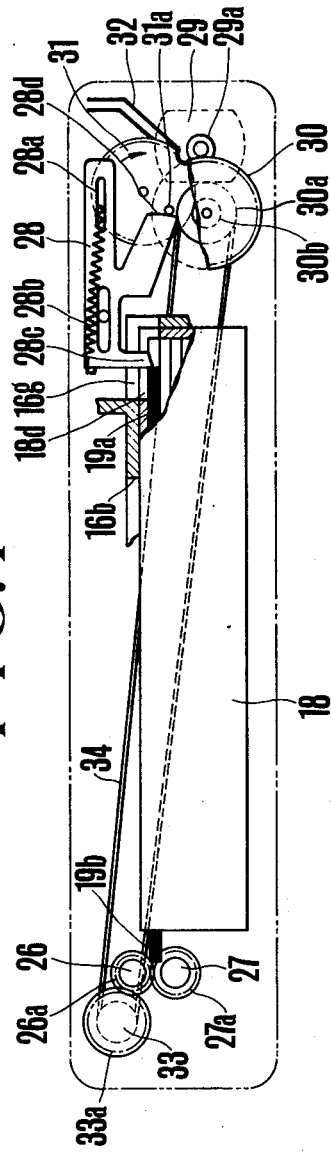
FIG. 3
FIG. 4

CAMERA

BACKGROUND OF THE INVENTION

1. Field of Invention

The present invention relates to a camera and particularly to cameras using self developing film.

2. Description of the Prior Art

Various types of self-developing film sheets instant cameras using such films are known. For example, U.S. Pat. No. 3,682,076 discloses a self developing type film in the form of sheets and a bag containing self developing solution. When the film is taken out of the camera after exposure, the bag containing the developing solution is broken, and the developing solution coming out of the bag is spread over the film to develop the latter. Here, a plural number of film sheets are put in a film cartridge one over the other, while a film cartridge is loaded in the camera. On the other hand, the instant photographic camera using the aforementioned film cartridge is disclosed in U.S. Pat. No. 3,689,262. In case of this camera, the sensitive sheets in the film cartridge are exposed one by one in such a manner that when the sensitive material on each sheet has been exposed, the exposed sheet is taken out of the camera by means of a film transport. The sensitive material is then led through press rollers in the transport mechanism, and the bag containing the developing solution in sheet is broken under the pressure of the press rollers in such a manner that the developing solution coming out of the bag is spread over the surface of the sensitive sheet. When the sheet travels through the press rollers, the developing solution is spread evenly over the surface of the sheet. Generally the aforementioned transport mechanism is driven by a motor. When mechanism is for example, manually driven, the driving speed varies from time to time, the developing solution is not spread evenly over the sensitive material and the speed influences the development. Thus, the mechanism of this kind of the camera is driven with a motor, which runs evenly.

This kind of camera excells in the speediness, namely the photograph taken can be seen on the spot, so that the camera is often used for example at parties, when photographs taken are handed over to the participants. Here the objects are often dark and are often in motion. When an object is photographed in a dark place for example by means of a camera with electronic shutter, the shutter time becomes longer in proportion to the darkness of the object and therefore the exposure time becomes longer and the photograph is out of focus. Thus, in such a case it is necessary to provide a speed light, i.e., flash, device in such a manner that the shutter time does not become longer than a certain value. Namely there are many opportunities to use the flash with this kind of camera, so that it is convenient to build the flash into the camera.

However this kind of the instant photographic camera is by far larger and less portable than those using 35 m/m roll film. In conventional cameras the problem of the camera size is solved by connecting the photographic lens and the camera body with means such as bellows. When a photograph is to be taken, the bellows are extended so that the length of the optical axis is proper for photographing between the photographic lens and the camera body. When the camera is not in use the bellows are shortened so as to bring the photographic lens part close to the camera body. Thus, it is important to make the instant photographic camera compact. For example the battery to be loaded should be small in number as well as in shape. Thus in order to econimize the space for the battery to be loaded in the camera, generally only one battery is loaded in the camera so as to drive other devices in the camera. For example, the only one battery loaded in the camera serves to drive not only the film transport device but also the exposure control device. Even when an electronic flash is provided, it is desirable to avoid providing a battery exclusively for the flash, because otherwise the size of the camera would become larger.

Hence, even when a flash device is provided or built in this kind of camera, it is desired that the current supply to the film transport device and the speed light device should be made from a single common battery in order to make the camera compact, because in this way the space occupied by batteries can be limited. However as soon as the sheets of sensitive material have been exposed in this kind of camera the film transport device starts to operate, while the flash unit also starts to charge as soon as the device has operated. However, this applies a large load to the power source.

Thus, when the flash device is charged immediately after flash photography while the sensitive material transportation device is driven, there is a fear that the motor may not start for a while. Further, even if the motor starts to rotate, there is a fear that the rotation speed may be low and unstable.

The above is a large problem in case of the instant photographic camera in which a self developing type film is used. Namely, in an instant photographic camera it is desirable that immediately after the exposure, namely the shutter operation the exposed sensitive material could be taken out of the camera and the photograph taken could be seen. Further unless the exposed sensitive material in sheet would be transported at a constant speed by means of the sensitive material transportation device, the exposed sensitive material would not be developed in a proper way, influencing the result of the development in an inprofitable way.

SUMMARY OF THE INVENTION

The first purpose of the present invention is to offer a camera in which the conventional difficulties have been eliminated.

The second purpose of the present invention is to offer a camera in which current is supplied to the sensitive material transportation device for feeding the sensitive material and the speed light device from a single common power source, so designed that a switch means is provided for automatically interrupting the current supply to the speed light device driving the current supply to the sensitive material transportation device so that it is prevented that an extremely large load should be given to the power source during the transportation of the sensitive materials.

The third purpose of the present invention is to offer a camera, so designed that a switch means is provided for automatically detecting whether the sensitive material has not yet been loaded and whether the sensitive material exits no more and interrupting the current supply to the speed light device so as to prevent the waste of the power source due to the operation of the speed light device when no photograph can be taken.

The fourth purpose of the present invention is to offer a camera, so designed that the loading space in which the speed light device is loaded in the camera body and the loading space in which the photographic lens part is loaded in the camera body are provided for the time in which no photograph is taken in such a manner that the speed light device can be taken out of the afore mentioned loading part only when the photographic lens part is taken out of the afore mentioned loading part so as to be ready for photographing.

The fifth purpose of the present invention is to offer a camera, so designed that the loading space in which the speed light device is loaded in the camera body and the loading space in which the photographic lens part is loaded in the camera body are provided for the time in which no photograph is taken in such a manner that the photographic lens and the speed light device are so engaged with each other that along with the loading operation of the photographic lens into the loading space the speed light device is also loaded into the loading space.

The sixth purpose of the present invention is to offer a camera, so designed that the loading space in which the the speed light device is loaded in the camera body and the loading space in which the photographic lens part is loaded in the camera body are provided for the time in which no photograph is taken in such a manner, that the speed light device can be taken out of the loading space so as to be used only when the photographic lens part is taken out of the loading space for photographing while a circuit opening and closing means is provided for interrupting the current supply to the charging circuit of the speed light device when the speed light device is loaded into the loading space and for enabling the current supply to the charging circuit of the speed light device when the speed light device is taken out of the loading space.

The seventh purpose of the present invention is to offer a camera, so designed that the loading space in which the speed light device is loaded in the camera body and the loading space in which the photographic lens part is loaded in the camera body are provided for the time in which no photograph is taken in such a manner that the photographic lens and the speed light device are so engaged with each other that the speed light device is loaded into the loading space along with the loading operation of the photographic lens part into the loading space while a circuit opening and closing means is provided for interrupting the current supply to the charging circuit of the speed light device when the speed light device is loaded into the loading space and for enabling the current supply to the charging circuit of the speed light device when the speed light device is taken out of the loading space.

The eighth purpose of the present invention is to offer a camera, so designed that in the neighborhood of the outlet through which the sensitive material in sheet is carried out by means of the sensitive material transporation device from the camera body in which the self developing type sensitive material in sheet can be used and at the position which the finger of the photographer who holds the camera body touches in a natural way a switching means is provided for opening the sensitive material transportation device under the pressure of the finger in such a manner that when the finger of the photographer is at the position at which the carrying out of the sensitive material is prevented the sensitive material transporation circuit is opened so as to stop the transportation of the sensitive material.

The ninth purpose of the present invention is to offer a camera, so designed that in the neighborhood of the outlet through which the sensitive material in sheet is carried out by means of the sensitive material transportation device from the camera body in which the self developing type sensitive material can be used and at the position which the finger of the photographer who holds the camera body touches in a natural way a switching means is provided for opening the sensitive material transportation circuit of the sensitive material transportation device under the pressure of the finger, whereby the sensitive material transportation circuit of the sensitive material transportation device is designed so as to be brought into the closable state after the shutter operation while a holding means is provided for holding the state until the sensitive material has been fed in such a manner that a certain determined amount of the sensitive material is fed when the driving circuit is not opened by means of the afore mentioned switch means while when the sensitive material has been fed the afore mentioned transportation circuit is opened.

The tenth purpose of the present invention is to offer a camera, so designed that in the neighborhood of the outlet through which the sensitive material is carried out by means of the sensitive material transportation device from the camera body in which the self developing type sensitive material can be used and at the position which the finger of the photographer who holds the camera body touches in a natural way a switch means is provided for closing the alarm circuit under the pressure of the finger in such a manner that an alert is produced when the finger of the photographer is at the position at which the transportation of the sensitive material is carried out when the sensitive material transportation circuit has been brought into the state in which the sensitive material can be transported after the shutter operation.

Further other purposes of the present invention will be disclosed from the explanations to be made in detail below in accordance with the accompanying drawings.

BRIEF DESCRIPTION OF THE DRAWINGS

FIG. 3 shows a section of the camera shown in FIG. 1 along the line A—A.

FIG. 4 shows the sensitive material transporting mechanism of the camera in accordance with the present invention shown in FIGS. 1 to 3 in detail.

DESCRIPTION OF THE PREFERRED EMBODIMENTS

Below the camera in accordance with the present invention will be explained in detail in accordance with the drawings of an embodiment.

Figure 1:
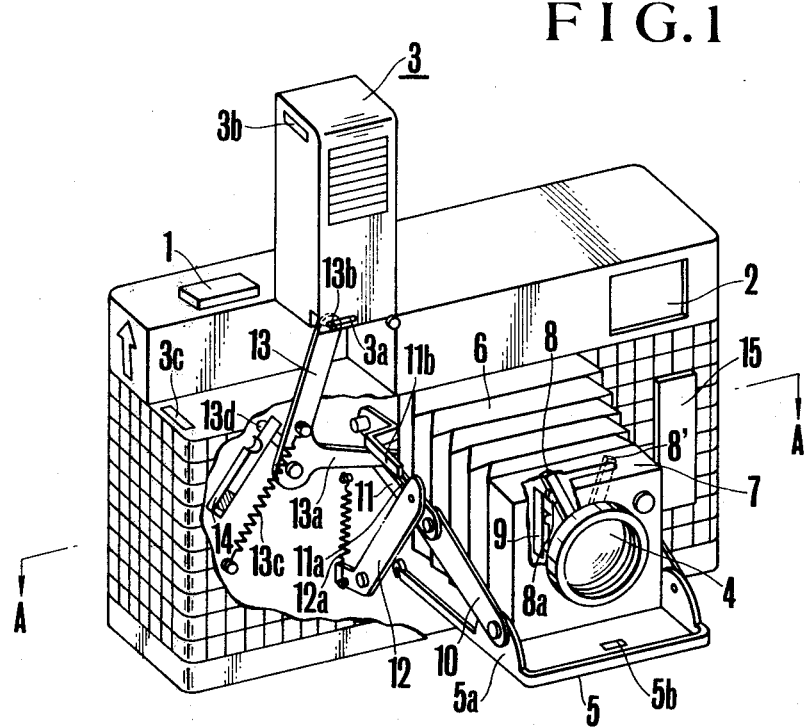
FIG. 1 shows the camera in accordance with the present invention ready for operation in perspective view.
Figure 2:
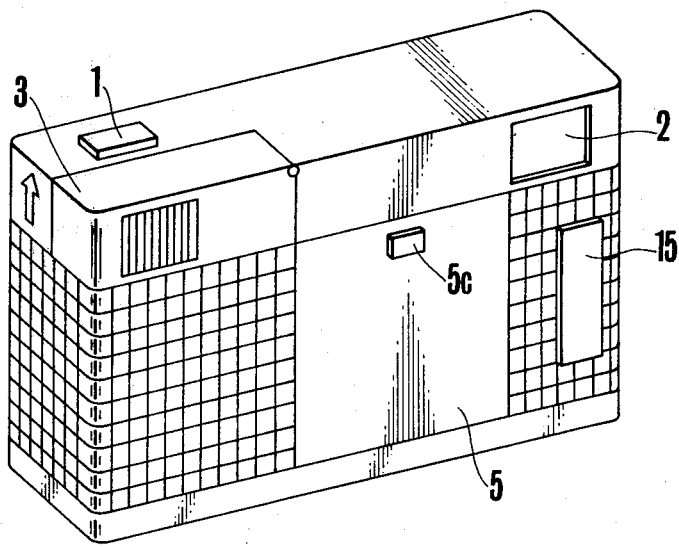
FIG. 2 shows the camera in accordance with the present invention in perspective view, whereby the speed light device and the photographic lens part are loaded in the camera body so that the camera is not ready for operation.

FIGS. 1 and 2 respectively show a camera in accordance with the present invention, whereby the camera is partially cut open. FIG. 1 shows the camera set so as to be able to carry out the speed light photography, while FIG. 2 shows the camera folded for transportation. In the drawing, 1 is the shutter button, 2 the objective lens in the view finder, 3 the speed light device built-in the camera, 4 the photographic lens, 5 the lens cover, 5a the front folded part, 5b the lock claw and 5c the nob for releasing the lock claw 5b. 6 is the bellows for connecting the shutter case 7 with the camera body in a lastic and a light way. 8 is the shutter charge lever, whereby 8' in a dotted line to the right in FIG. 1 shows the position of 8 at which the shutter has been charged. 9 is the switch to be opened with the insulated projection 8a when the shutter is released and the lever 8 is translated into the position shown in the drawing. 10 is the lever whose one end is pivoted at the front folded part 5a of the lens cover and whose other end is pivoted at the one end of the lever 11. The other end of the lever 11 is pivoted on the fixed member (not shown in the drawing) at the side of the camera body in the same way as in case of the rear fulcrum of the lens cover 5. Further in the lever 11 a long hole 11a is provided, in which the pin provided at the one end of the lever 12 is engaged. The lever 12 is pivoted in the fixed part (not shown in the drawing) at the side of the camera body, while the other end of the lever 12 the spring 12a is engaged in such a manner that the lever 12 is urged along the clockwise direction. At the one end 13a of the lever 13 pivoted at the fixed part (not shown in the drawing) of the camera body is crossed with the folded arm 11b of the lever 11, being functionally engaged therewith. The pin 13b provided at the other end is in free engagement in the long hole 3a provided in the cover of the speed light device 3 as is shown in FIG. 1. Further with the lever 13 the spring 13c is engaged in such a manner that in the state shown in FIG. 1 the lever 13 is urged along the counter clockwise direction while the lever 13 has been rotated along the clockwise direction beyond the dotted line shown in FIG. 1, the lever is urged clockwise direction. By means of the insulation pin 13d provided on the lever 13 the normally opened switch 14 is compelled to be closed in the state shown in FIG. 1.

15 provided on the external surface of the camera is the switch (or flash unit responsive switch means) board to be automatically pressed with the fingers of the photographer who holds the camera, so as to open the normally closed switch to be explained later. Further 3b and 3c provided at the speed light device 3 and at the side of the camera are the shock absorbing members in order to absorb the shock arising when the speed light device is loaded as is shown in FIG. 2.

In case of the camera shown in FIG. 1, the lens part and the speed light device can be folded so as to be loaded in the loading space provided in the camera body for the sake of transportation as is shown in FIG. 2. Further in order to fold the foldable lens part consisting of the afore mentioned member 4-12, the lever 12a is rotated against the strength of the spring 12a along the counter clockwise direction, whereby the pin provided on the lever 12a moved in the long hole 11a in the lever 11 in such a manner that the members are loaded in the state as shown in FIG. 2, while the lever 10 is rotated along the counter clockwise direction. In the loaded state, the lock claw 5b is engaged with the fixed part (not shown in the drawing) at the side of the camera whereby the lens cover 5 is held in the state shown in FIG. 2. In order to resume the state shown in FIG. 1, it is sufficient to operate the nob 5c so as to release the lock claw 5b, whereby the state shown in FIG. 1 is resumed by means of the strength of the spring 12a.

In case the speed light device 3 is set up as is shown in FIG. 1 when the lens part is to be loaded, the speed light device 3 is automatically loaded in functionally engaged with the loading of the lens part as is shown in FIG. 2. Namely, when the lens part is loaded, the arm 13a of the lever 13 is outside of the moving course of the members 4-10 and 12 so that the lens part can be loaded, while the arm 13a of the lever 13 is inside of the moving course of the folded arm 11b of the lever 11. Thus, along with the start of the loading of the lens part, the lever 13 is rotated along the clockwise direction until the lens part is loaded as is shown in FIG. 2. Further, in case the folded arm 11b is designed so as to be in contact with the arm 13a of the lever 13, when the lens part has been loaded and locked by means of the lock claw 5b, the speed light device 3 can never stand up against the spring 13c due to the vibration of the camera, which is profitable.

It is clear from the above explanation that it is possible to load only the speed light device out of the state shown in FIG. 1 in which the speed light device is possible while further the lens part can be loaded out of the state.

It goes without saying that it is possible to draw out only the lens part out of the loaded state shown in FIG. 2, never being hindered with the lever 13 and then draw up the speed light device.

On the other hand it is impossible to draw up only the speed light device out of the state shown in FIG. 2. When it is tried to draw up only the speed light device out of the state shown in FIG. 2, the lever 13 is urged along the counter clockwise direction, whereby the arm 13a is in contact with the folded arm 11b in such a manner that a strength is given along the direction along with the lens part is drawn out. However, the lens part is locked by means of the lock claw 5b so that it is impossible to draw out the lens part while it is nor possible to draw up only the speed light device. The reason why the mechanism is so designed is that it is nonsense for photographing to bring only the speed light device in operable state while the lens part is not ready for photographing. Further, the folding system in which the lock claw 5b is multified, the spring 12a is so designed as to give the strength along the reversed direction and the lock means (not shown in the drawing) for locking the lens part in the drawn out state is also applicable. However, even in case of this variation, it is impossible to draw up only the speed light device out of the state shown in FIG. 2, whereby when the speed light device is drawn up, the lens part is also drawn out in functional engagement therewith into the state shown in FIG. 1. It goes without saying that the above composition is also very profitable in practice.

Below the switch 14 will be explained. The switch 14 is the normally opened switch to be closed only when the lever 13 is at the position shown in FIG. 1, namely only when the speed light device 3 is in the drawn up state, being so designed as to close the charge circuit of the speed light device only when the speed light device is drawn up.

Below the function of the switch 14 will be explained in connection with the loaded state of the lens part and the speed light device.

The present embodiment is so designed that when the lens part is loaded the speed light device is also loaded without fail in functional engagement therewith in such a manner that in the loaded state shown in FIG. 2 the switch 14 is opened and therefore the speed light device is not charged so as to prevent the consumption of the power source. Thus in case of the camera in accordance with the present invention the largest difficulty of the conventional camera in which the power source of the speed light device is often consumed due to the careless oblision of opening the power source switch can be solved. Further, in case of the photography under the day light only the lens part is drawn out while the switch 14 remains opened so that the consumption of the power source can be prevented in the same way.

When the speed light device is drawn up in case of the speed light photography the lens part is also drawn out in functional engagement therewith into the state shown in FIG. 1 while at the same time the speed light device starts to be charged so as to enable the speed light photography. Further, when the speed light is no more necessary or not necessary for a while, the speed light device is loaded in a very natural way and the charge circuit for the speed light device is opened in functional engagement therewith. Thus, it is impossible to forget to open the charging circuit of the speed light.

The switch 9 and the switch board shown in FIG. 1 and FIG. 2 will be explained.

FIGS. 3 and 4 show the section of the camera in accordance with the present invention shown in FIGS. 1 and 2, in enlargement. 15 in FIGS. 3 and 4 is the afore mentioned switch board. The switch board 15 is mounted in the concave part 16a in the frame of the camera, normally projecting somewhat outside of the camera due to the contact pressure of the change over switch, while when the camera is held by the photographer, the switch board 15 is pushed by the fingers of the photographer in a natural way in such a manner that the change over switch is changed over from the contact piece $17_1$ to $17_2$. 15', 16a' and 17' respectively correspond to the switch board 15, the switch board holder 16a and the change over switch 17, being provided on the near external wall of the camera. When both switch boards 15 and 15' are provided, the change over switches 17 and 17' respectively in functional engagement with the boards are connected in series or parallel to each other, whereby it is already sufficient to provide either the switch board 15 or 15'. 18 is the cassette in which the self developing process sensitive material 19 in sheet is loaded as is disclosed in the U.S. Pat. No. 3,682,076, while 18a is the exposure frame part to be positioned behind the exposure frame part 16b of the frame of the camera body when the cassette 18 is loaded in the camera. Through this part the image of the object is formed on the photosensitive layer of sensitive material in sheet by means of the shutter, the aperture and the photographic lens 4 provided on the shutter frame 7 so as to be exposed. 18b is the outlet provided at the side of the cassette for carrying the exposed sensitive material 19 in sheet out of the cassette 18, while 16c is the outlet provided at the side of the frame of the camera body.

18c is the notch in the cassette 18, while the frame 16 of the camera body has the notch at the corresponding position. 20 is the press plate for the sensitive material, presenting a notch 20a at the position corresponding to the position of the afore mentioned notch 18c of the cassette 18, whereby by means of the strength of the press spring 21 the sensitive material 19 in sheet is brought in close contact with the exposure frame part 18a of the cassette. 22 is the back cover for mounting and dismounting the cassette, whereby 22a is the rotary shaft while 22b is the lock claw. Thus, when the lock claw 22b is released and rotated around 22a along the counter clockwise direction, the cassette can be mounted and dismounted. Further in the closed state of the back cover 22, the casette 18 is pressed upwards by means of the cassette press spring 23 provided on the back cover 22, in such a manner that the relative position of the frame 16 of the camera body to the cassette 18 is determined while the relative position of the cassette 18 to the sensitive material 19 in sheet is also determined. 24 is the lever for detecting the existence of the sensitive material, being pivoted on the fixed part (not shown in the drawing) of the camera body and thereby urged along the counter clockwise direction by means of the spring 24a in such a manner that the projecting end 24b is normally pressed to the sensitive material 19 in sheet as is shown in the drawing. However, in case no sensitive material 19 in sheet exists in the cassette, because the notch 20a is provided in the press plate 20 as is mentioned afore, the detecting lever 24 rotates along the counter clockwise direction out of the state shown in the drawing so as to open the normally closed switch 25. Further, it goes without saying that when the cassette 18 is not loaded in the camera, the afore mentioned switch 25 is opened. As soon as the sensitive material 19 in sheet starts to be transported to the left, the switch 25 is opened by means of the detecting lever 24, whereby no difficulty connected herewith takes place by means of the circuit to be explained below. 26 and 27 are the rollers for transporting the sensitive material 19 in sheet to the left and coating the developing solution evenly on the exposed sensitive sheet 19 in sheet. Further, 16e is the slit shaped opening provided on the frame of the camera body for carrying the sensitive material 19 in sheet by means of the rollers 26 and 27 out of the camera, being provided with a weak plate spring 16f for preventing the exposure to the sensitive material 19 in sheet still insufficiently processed and the dropping down of the pressed sensitive material 19 in sheet out of the camera.

FIG. 4 shows the state when the sensitive material has started to be transported, whereby 18d is the notch in the cassette 18 while 16g is the notch of the frame 16 of the camera body at the corresponding position. 28 is the feeding claw of the sensitive material, being movable to the right and the left in the long hole 28a and normally drawn to the right by means of the spring 28b. When along with the rotation of the motor 29 the part 28a is pushed, the feeding claw moves to the left in such a manner that the rear end 19a of the sensitive material 19 in sheet is pushed by means of the claw part 28c so as to push the sensitive material 19 in sheet until the front end 19b is engaged between the afore mentioned rollers 26 and 27. 29 is an electric motor, whereby 29a is the pinion gear, 30 the gear engaged with 29a, 30a and 30b the pulley and the gear rotated as one body with 30a and 30b and 31 the gear engaged with 30b, whereby on 31 the pin functionally engaged with the rear end 28d of the sensitive material feeding claw 28 and opening the normally closed switch 32 at the time point at which the sensitive material has been transported is provided. 33 is the pulley driven by the belt 34 through the pulley 30a, the gear 33a to be rotated as one body with 33 is engaged with the gear 26a to be rotated as one body with the roller 26 and the gear 26a is engaged with the gear 27a to be rotated as one body with the roller 27.

Below the operation of the sensitive material feeding mechanism shown in FIGS. 3 and 4 will be explained.

When at first, as has been explained in accordance with FIGS. 1 and 2, the lens part is drawn out, the shutter charge lever 8 is moved into the position 8' and the shutter button 1 is operated, the shutter operates so as to expose the sensitive material 19 in sheet. When the sensitive material 19 in sheet is loaded, the switch 25 is closed, so that by means of the circuit to be explained later in accordance with FIG. 5 the motor starts to run so as to rotate the pinion gear 29a along the clockwise direction. FIG. 4 shows the state when the motor has started to run. At the time point at which the motor starts to run, the pin 31a opens the normally closed switch 32 while current is supplied to the motor 29 not through the switch so as to drive the motor. Along with the rotation of the pinion gear 29a along with the clockwise direction the gears and the pulley 30a are rotated in such a manner that the pin 31a moves along with the rotation of the gear 31 along the clockwise direction. The sensitive material feeding claw 28 is moved to the left, being pushed to the left by means of the pin 31a, whereby the rear end 19a of the sensitive material 19 in sheet is pushed by the claw part 28c until the part 19b is sufficiently engaged between the rollers 26 and 27.

The rollers 26 and 27 are rotated by the motor 29 through the gears, the pulley and the belt in such a manner that the sensitive material 19 in sheet whose front end 19b is inserted is pushed to the right until the rear end 19a leaves the rollers 26, 27. At this time the developing solution is coated until the visible image is obtained on the sensitive material in sheet soon. After the termination of the feeding of the sensitive material 19 in sheet the pin 31a rotates once so as to open the switch (or feed responsive switch means) 32, whereby the current supply to the motor 29 is interrupted and the motor 29 stands still. In this way the normal photographic operation is carried out, which will be explained below in detail in accordance with FIG. 5 in connection with the safety switch 17(17') and 25.

Figure 5:
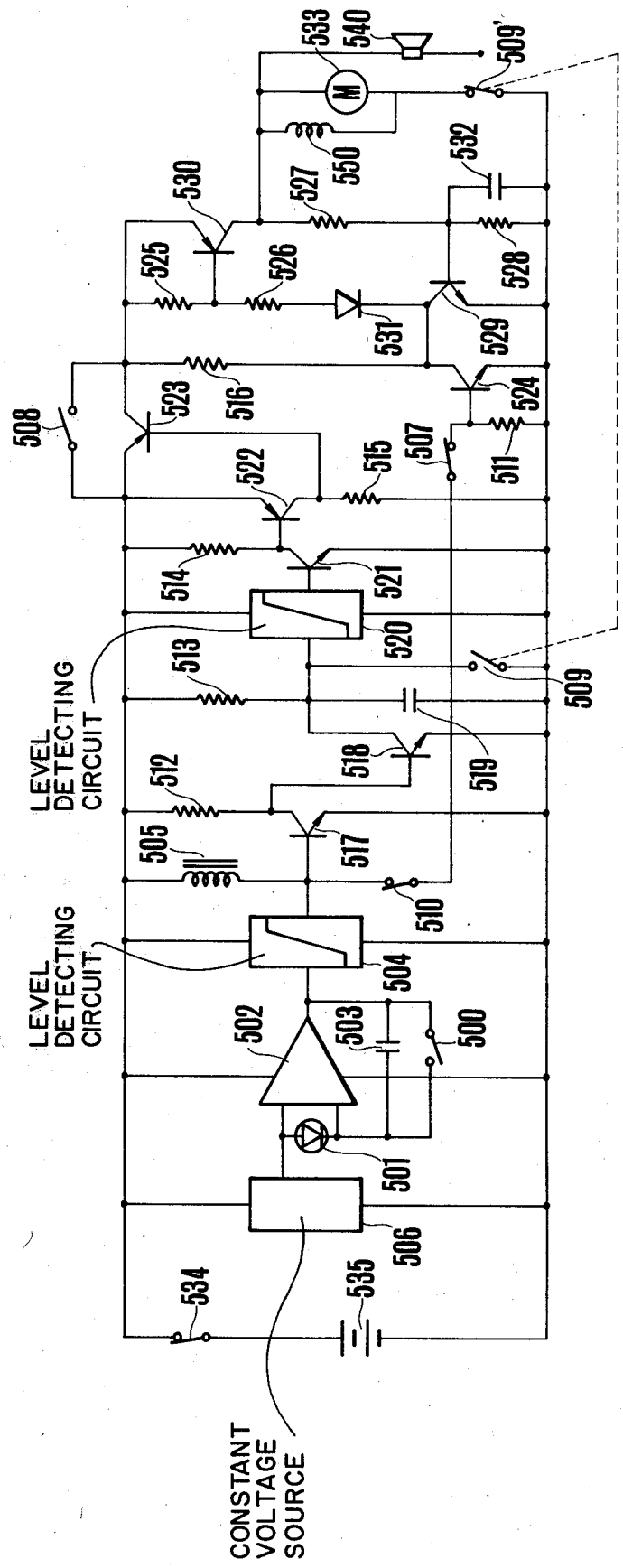
FIG. 5 shows the circuit diagram of the driving control circuit of the electronically controlled shutter and the sensitive material transport motor to be used in the camera in accordance with the present invention.
Figure 6:
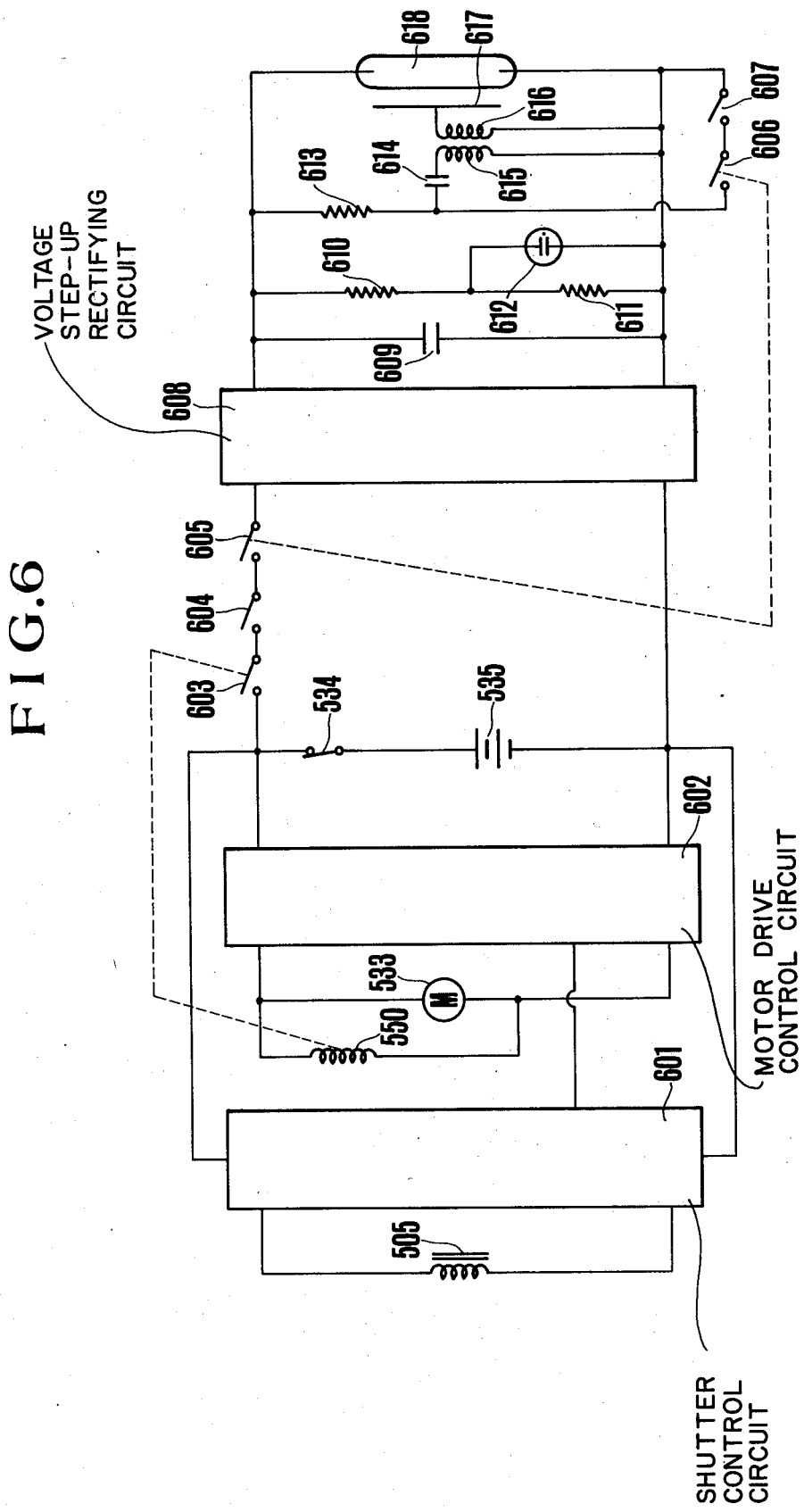
FIG. 6 shows the circuit diagram of the control circuit of the speed light device to be used for the camera in accordance with the present invention.

FIG. 5 shows the driving control circuit for the electronically controlled automatic exposure shutter and the sensitive material feeding motor, while FIG. 6 shows the circuit of the speed light device.

In FIG. 5, 500–506 constitute the conventional light measuring time control circuit, whereby when the count switch 500 of the camera is opened, the time integrating condenser 503 connected between the output and the input of the high input impedance operational amplifier 502 starts to be charged with the photoelectrical current of the photovoltaic photoelectrical converting element 501 in such a manner that when the output voltage of the operational amplifier 502 reaches a certain determined level, the level detecting circuit 504 is inversed so as to release the rear shutter plane holding magnet 505 and terminate the exposure. 506 is the constant voltage source for setting the bias level. 507–533 constitute the motor control circuit for automatically carrying out the processed sensitive material in sheet, whereby 507 is the switch for detecting the existence of the sensitive material in sheet (opened in case there is no sensitive material in sheet), 508 the switch (or material responsive switch means) to be opened only when the sensitive material has been carried, 509 and 509' the switches for transfer respectively closed and opened in case the outlet for the sensitive material of the camera is held by the hand and 510 the safety switch to be opened after a certain determined time after the rear shutter holding magnet 505 is opened.

When the shutter control magnet 505 is opened in case the outlet of the sensitive material is not held by the hand (the switch 509 is opened, while the switch 509' is closed), the transistor 517 is switched on while 518 is switched off so that for a certain time determined by the condenser 513 and the condenser 519 the level detecting circuit 520 remains in the non-inversed state whereby the transistors 521 and 522 remain in the switched off state in such a manner that the current supply control transistor 523 remain in the switched on state for a certain determined time. When the sensitive material loaded in the camera, the switch 507 is closed so that at the moment at which the rear shutter plane holding magnet 505 is opened the transistor 524 is closed through the switches 510 and 507 in such a manner that the latch circuit consisting of the resistances, 525–528, the transistors 529 and 530, the diode 531 and the condenser 532 is brought into the self holding state. Thus the motor 533 for feeding the sensitive material starts to run, whereby the sensitive material feeding termination switch 508 is closed so as to keep the current supply to the motor and feed the sensitive material in sheet. When the sensitive material in sheet has been fed, the sensitive material feeding termination switch 508 is opened, whereby the afore mentioned transistor 523 has been opened so that the current supply to the latch through the resistances 525–532 is interrupted whereby the self holding is released while the current supply to the motor M is interrupted.

In case the outlet of the sensitive material is held by the hand, the motor M does not start to run because the switches 509 and 509' are connected along the reversed direction, while when the hand leaves the outlet the switches 509 and 509' are connected as is shown in the drawing in such a manner that current is supplied to the motor M through the transistor 523 during a certain time determined by the resistance 513 and the condenser 519. When the motor M rotates somewhat and the sensitive material feeding termination switch 508 is closed, the normal current supply to the motor M is maintained even after the transistor 523 is switched off.

In case no sensitive material is loaded, the switch 507 for detecting the existence of the sensitive material is opened, whereby the transistor 524 is switched off so that the latch circuit 525–532 is in inoperative state and no current is supplied to the motor M. The safety switch which is opened a little later than the interruption of the shutter control magnet 505 is the misoperation prevention safety switch essential for a camera of other system than that in accordance with which the count switch 500 is automatically reset before the sensitive material feeding termination and is closed.

Without the switch 510 the switches 509 and 509' are connected along the reversed direction to the shown when the outlet for the sensitive material in sheet is held after the sensitive material has been fed, whereby the transistors 521 and 522 is switched off while 523 is switched on and therefore the latch circuit is brought into the self holding state so that when the hand leaves the outlet for the sensitive material in sheet the motor M starts to rotate again and the unexposed sensitive material is fed. The safety switch 501 is for preventing this kind of misoperation in the present circuit.

Further the switch for detecting the sensitive material shown in FIG. 3 is opened a little later than the feeding start of the sensitive material in the cassette, whereby however, due to the afore mentioned latch circuit the motor M operates until the termination of the feeding of the sensitive material after the feeding has once been started even if the switch 507 is opened. 540 is the buzzer which produces the acoustic alarm through the switch 509' when the outlet for the sensitive material is held by the hand after photographing, while when the hand leaves the outlet so as to start the feeding, the outlet is held by the hand again during the feeding so as to prevent the irregular development and so on.

550 is the coil for preventing the current supply to the speed light device during the current supply.

Below the circuit of the speed light device will be explained in accordance with FIG. 6.

In FIG. 6, the same members as those in FIG. 5 present the same figures.

In FIG. 6, 534, 535, 550, 533 and 505 are respectively the power source switch, the power source, the magnet, the motor and the shutter control magnet. 601 is the shutter control circuit explained in detail in accordance with FIG. 5, while 602 is the motor driving control circuit. 603 is the switch to be opened during the current supply to the magnet 550, namely during the running of the motor 533, while 604 is the switch to be opened when there is no sensitive material (corresponding to the switch 25 in FIG. 3).

Both 605 and 606 are the switches (or flash unit responsive switch means) to be closed when the speed light device 3 is drawn up, corresponding to the switch 14 shown in FIG. 1. 607 is the synchronization contact, 608 the conventional voltage step up rectifying circuit, 609 the main condenser and 610 and 611 the resistances constituting a voltage dividing circuit so as to actuate the neon tube at the termination of the charge. 613, 614, 615, 616 and 617 are the resistances, the condenser, the primary coil, the secondary coil and the trigger electrode for constituting the conventional trigger circuit. Further, 618 is the discharge tube.

The speed light device circuit constituted as mentioned above operates as follows. Namely, when the power source 535 is connected to the voltage step up rectifying circuit 608, the speed light device is charged in the same as the conventional one and the neon tube 612 lights up, whereby the discharge tube 618 operates with the closure of the synchronization contact 607. However, when the speed light device is loaded, the switch 606 is opened so that the speed light device does not operate with the closure of the synchronization contact 607 even if the main condenser 609 has been sufficiently charged. It goes without saying that no charging is carried. Further, in case the sensitive material in sheet is not loaded, the switch 604 is opened so that the charging is not carried out. Further no charging is carried out even when current is supplied to the motor 533 while the switch 603 is opened by means of the magnet 550. In consequence, the present invention presents many features, some of which are as follows.

(1) In case of the camera in which current is supplied to the motorized sensitive material feeding device and the speed light device from a single common power source, it is prevented that an extremely large load is laid on the power source during the sensitive material feeding because a switch means is provided for automatically interrupting the current supply to the speed light device during the current supply to the motorized sensitive material feeding device.

(2) The waste of the power source can be prevented, because a switch means is provided for automatically detecting whether the sensitive material has been loaded or whether the sensitive material still exists, so as to interrupt the current supply to the charge circuit of the speed light device.

(3) The loading space in which the speed light device is loaded in the camera body and the loading space in which the photographic lens part is loaded in the camera body are provided for the time in which no photographing is carried out in such a manner that the speed light device can be taken out of the afore mentioned loading part only when the photographic lens part is taken out of the afore mentioned loading part so as to be ready for photographing, so that the waste of the power source can be avoided in the same way.

(4) The loading space in which the speed light device is loaded in the camera body and the loading space in which the photographic lens part is loaded in the camera body are provided for the time in which no photographing is carried out in such a manner that the photographic lens and the speed light device are engaged with each other in such a manner that along with the loading operation of the photographic lens into the loading space the speed light device is also loaded into the loading space so that the operation as well as the manufacturing is easy.

(5) The loading space in which the speed light device is loaded in the camera body and the loading space in which the photographic lens part is loaded in the camera body are provided for the time in which no photographic is carried out in such a manner that the speed light device can be taken out of the loading space so as to be used only when the photographic lens part is taken out of the loading space for photographing while a circuit opening and closing means is provided for interrupting the current supply to the charging circuit of the speed light device when the speed light device is loaded into the loading space and for enabling the current supply to the charging circuit of the speed light device when the speed light device is taken out of the loading space so as to be ready for operation so that unnecessary current does not flow to the speed light device.

(6) The loading space in which the speed light device is loaded in the camera body and the loading space in which the photographic lens part is loaded in the camera body are provided for the time in which no photographing is carried out in such a manner that the photographic lens and the speed light device are so engaged with each other that the speed light device is loaded into the loading space along with the loading operation of the photographic lens part into the loading space while a circuit opening and closing means is provided for interrupting the current supply to the charging circuit of the speed light device when the speed light device is loaded into the loading space and for enabling the current supply to the charging circuit of the speed light device when the speed light device is taken out of the loading space so as to be ready for operation so that unnecessary current does not flow to the speed light device.

(7) In the neighborhood of the outlet through which the sensitive material in sheet is carried out by means of the motorized sensitive material feeding device from the camera body in which the self developing type sensitive material in sheet can be used and at the position which the finger of the photographer who holds the camera body touches in a natural way a switching means is provided for opening the sensitive material feeding circuit of the motorized sensitive material feeding device under the pressure of the finger in such a manner that when the finger of the photographer is at the position at which the carrying out of the sensitive material in sheet is prevented the sensitive material feeding circuit is opened so as to stop the feeding of the sensitive material so that the carrying out of the sensitive material is not hindered during the operation, whereby the developing process can be carried out under a certain determined conditions.

(8) In the neighborhood of the outlet through which the sensitive material in sheet is carried out by means of the motorized sensitive material feeding device from the camera body in which the self developing type sensitive material in sheet can be used and at the position which the finger of the photographer who holds the camera body touches in a natural way a switching means is provided for opening the sensitive material feeding circuit of the motorized sensitive material feeding device under the pressure of the finger, whereby the sensitive material feeding circuit of the motorized sensitive material feeding device is designed so as to be brought into the closable state after the shutter operation while a holding means is provided for holding the state until the sensitive material has been fed in such a manner that a certain determined amount of the sensitive material in sheet is fed when the driving circuit is not opened by means of the afore mentioned switch means while when the sensitive material has been fed the feeding circuit is opened so that the sensitive material in sheet is carried out with sureness.

(9) In the neighborhood of the outlet through which the sensitive material in sheet is carried out by means of the motorized sensitive material feeding device from the camera body in which the self developing type sensitive material in sheet can be used and at the position which the finger of the photographer who holds the camera body touches in a natural way a switch means is provided for closing the alarm circuit under the pressure of the finger in such a manner that an alert is produced when the finger of the photographer is at the position at which the transportation of the sensitive material is carried out when the sensitive material feeding circuit has been brought into the state in which the sensitive material can be fed after the shutter operation so that the sensitive material is carried out with sureness.

What is claimed is:

1. A camera using means containing a developing solution and a sheet of light sensitive material on which a visible image is formed after treatment by the processing solution in the containing means after exposure, comprising;
   (a) a power source for the camera,
   (b) a first device for exposing the sensitive plane of the sensitive material,
   (c) a second device in which the sensitive material is loaded, said second device including;
      feed means for advancing the sensitive material after exposure, processing the exposed sensitive material with the processing solution during the advancement and carrying the processed sensitive material out of the second device, said feed means having a motor driven with the current from the power source,
      a flash unit movable to an operating position at which the unit projects from the second device for operation and to an inactive position at which the unit is loaded in the second device out of operation,
      flash unit responsive switch means between the source and the flash unit for opening upon movement of the flash unit into the inactive position, and
   (d) connecting means for connecting the first device with the second device, said connecting means having a first state in which the first device is spaced from the second device at a distance suitable for photographing and in a second state in which the first device is kept in close contact with the second device, and further including means for preventing the unit from assuming the operative position when said connecting means is in the second state,
      the second device including means for prohibiting current supply to the flash unit from the power source when the feed means is in operation.

2. A camera in accordance with claim 1, wherein the flash unit is mechanically linked with the connecting means in such a manner that the flash unit projects from the second device when the connecting means is in the first state while the flash unit is loaded in the second device when the connecting means is in the second state.

3. A camera in accordance with claim 2, wherein the flash unit includes enabling means for enabling the selective loading of the flash unit into the second device when the connecting means is in the second state.

4. A camera using means containing a developing solution and a sheet of light sensitive material on which a visible image is formed after treatment by the processing solution in the containing means after exposure, comprising;
   (a) a power source for the camera,
   (b) a first device for exposing the sensitive plane of the sensitive material,
   (c) a second device in which the sensitive material is loaded, said second device including;
      feed means for advancing the sensitive material after exposure, processing the exposed sensitive material with the processing solution during the advancement and carrying the processed sensitive material out of the second device, said feed means having a motor driven with the current from the power source,
      a flash unit movable to an operating position at which the unit projects from the second device for operation and to an inactive position at which the unit is loaded in the second device out of operation, and
      switch means between the source and the flash unit for opening upon movement of the flash unit into the inactive position,
   (d) connecting means for connecting the first device with the second device, said connecting means having a first state in which the first device is spaced from the second device at a distance suitable for photographing and in a second state in which the first device is kept in close contact with the second device, and further including a means for preventing the unit from assuming the operative position when said connecting means is in the second state the second device including an outlet and stopping means for stopping the feed means when the outlet of the second device through which the sensitive material is carried out is covered by the hand of a photographer.

5. A camera using a means containing the developing solution in which a visible image is formed on sheets of light sensitive material after exposure and treatment by the processing solution in the containing means, comprising;
(a) a power source,
(b) a first device for exposing the sensitive plane of the sensitive material said device including:
shutter means, and
switch means to be closed with the shutter means after the operation of the shutter means,
(c) a second device in which the sensitive material is loaded, said device including;
feed means for advancing the sensitive material after exposure, processing the exposed sensitive material with the processing solution during the advancement and carrying the processed sensitive material out of the second device, said feed means including a motor driven with the current from the power source,
first switch means between the motor and the source for detecting when the feed means has carried out a predetermined amount of work so as to interrupt the current supply to the motor from the power source,
a flash unit on the second device and movable from one position at which the device projects from the second device for operation to another inactive position at which the device is loaded in the second device,
second switch means coupling the motor to the source and responsive to movement of the flash unit into the position at which the flash unit is used so as to supply current from the power source to the motor, and
means for prohibiting current supply to the flash unit until the first switch means is closed,
connecting means for connecting the first device with the second device, said connecting means being settable to a first state in which the first device is spaced from the second device at a distance suited for photography and in a second state in which the first device is in contact with the second device and further including locking means for preventing the flash unit from assuming the one position when said connecting means is in the second state.

6. A camera in accordance with claim 5, wherein the connecting means includes a bellows for shading the space formed between the first device and the second device.

7. A camera in accordance with claim 5, wherein the flash unit is mechanically linked with the connecting means so that when the connecting means is brought in the first state, the flash unit is moved into the one position while when the connecting means is placed in the second state the flash light device is moved into the second position.

8. A camera in accordance with claim 7, wherein the flash unit includes enabling means for enabling the selective loading of the flash unit into the second device when the connecting means is set in the second state.

9. A camera using a means containing the developing solution in which a visible image is formed on sheets of light sensitive material after exposure and treatment by the processing solution in the containing means, comprising;
(a) a power source,
(b) a first device for exposing the sensitive plane of the sensitive material said device including
shutter means, and
switch means to be closed with the shutter means after the operation of the shutter means,
(c) a second device in which the sensitive material is loaded, said device including;
feed means for advancing the sensitive material after exposure, processing the exposed sensitive material with the processing solution during the advancement and carrying the processed sensitive material out of the second device, said feed means including a motor driven with the current from the power source,
feed responsive switch means between the motor and the source for detecting when the feed means has carried out a predetermined amount of work so as to interrupt the current supply to the motor from the power source,
a flash unit on the second device and movable from one position at which the device projects from the second device for operation to another inactive position at which the device is loaded by the second device,
flash unit responsive switch means coupling the motor to the source and responsive to movement of the flash unit into the position at which the flash unit is used so as to supply current from the power source to the motor, and
means for prohibiting current supply to the flash unit until the first switch means is closed,
(d) connecting means for connecting the first device with the second device, said connecting means being settable to a first state in which the first device is spaced from the second device at a distance suited for photography and in a second state in which the first device is in contact with the second device and further including locking means for preventing the flash unit from assuming the one position when said connecting means is in the second state, the second device including an outlet and stop means for stopping the drive of the feed means when the outlet of the second device through which the sensitive material is passed by the feed means is covered by the hand of the photographer.

10. A folding camera, comprising:
(a) a housing including first and second housing sections mounted for relative movement between a compact folded position and an extended position wherein said first and second housing sections define a space therebetween, said first housing section having a recess on the external wall thereof;
(b) means provided in said first housing section for locating a film unit in position for exposure;
(c) exposure means including optical means for exposing said film unit located at said exposure position, said optical means including an objective lens mounted on said second housing section for transmitting image-bearing light along an optical path within said space defined between said housing sections in their extended position;
(d) a flash unit containing therein flash tube means, said flash unit being pivotally coupled with said housing to be shiftable between an operating position in which it protrudes out of said recess to permit operation thereof and an inactive position in which it is placed inside said recess in an inoperative state, at least a portion of said flash unit forming a portion of the external wall of said first housing section when said flash unit is positioned inside the recess;

(e) a collapsible and erectable bellows formed of a flexible, light-opaque material, said bellows being coupled to said first and second housing sections for shifting therewith to a compact collapsed position as said first and second housing section shift to said folded position and to an expanded position as said first and second housing sections shift to said extended position, in which said expanded bellows defines light blocking walls within said space for excluding extraneous light along said optical path; and (f) joining means for operatively coupling said first and second housing sections, said flash unit and said bellows with each other in such a manner that said first and second housing sections, said flash unit and said bellows are movable to their respective positions in cooperation with each other.

11. A camera according to claim 10, wherein said joining means includes a first coupling means for guiding said first and second housing sections during shifting their positions and, at the same time, for shifting the position of said bellows, and a second coupling means which effects the shifting of the position of said flash unit in response to the operation of said first coupling means; said first coupling means being pivotally coupled with said first housing section at one end thereof and with said second housing sections at the other end thereof; and said second coupling means being pivotally coupled with said flash unit at one end thereof and with said first coupling means at the other end thereof.

12. A camera according to claim 11, wherein said first coupling means has a first movable member one end of which is pivotally coupled with said first housing section and a second movable member which is pivotally coupled with said second housing section; and the other end of said first movable member is pivotally coupled with the other end of said second movable member.

13. A camera according to claim 11, wherein said second coupling means includes first urging means which constantly urges said flash unit to rotate toward said inactive position thereof; and said first coupling means including second urging means which constantly urges said first and second housing sections to move to said extended position, said first urging means being arranged to have a weaker urging force than said second urging means.

14. A camera according to claim 10, wherein said coupling means has a cover member which covers said second housing section and forms a portion of the external wall of said first housing section when said first and second housing sections are set in said compact folded position.

15. A folding camera, comprising:
(a) a supply circuit connectable to a power source for the camera;
(b) flash unit responsive switch means;
(c) a housing including first and second housing sections mounted for relative movement between a compact folded position and an extended position wherein said first and second housing sections define a space therebetween, said first housing section having a recess on the external wall thereof;
(d) means provided in said first housing section for locating a film unit in position for exposure;

(e) exposure means including optical means for exposing said film unit located at said exposure position, said optical means including an objective lens mounted on said second housing section for transmitting image-bearing light along an optical path within said space defined between said housing sections in their extended position;

(f) a flash unit electrically connected to said supply circuit through said switch means, said flash unit containing flash tube means therein, said flash unit being pivotally coupled with said housing in such a manner as to be shiftable between an operative position in which the flash unit protrudes out of said recess to permit operation thereof and an inactive position in which the flash unit is placed within said recess in an inoperative state, a portion of the external wall of said first housing section being formed by at least a portion of said flash unit when the flash unit is placed in said recess of said first housing section;

(g) a collapsible and expandable bellows formed of a flexible, light-opaque material, said bellows being coupled to said first and second housing sections for shifting therewith to a compact collapsed position as said first and second housing sections shift to said folded position and to an expanded position as said first and second housing sections shift to said extended position, in which said expanded bellows defines light blocking walls within said space for preventing extraneous light from following along the optical path; and (h) connecting means for operatively coupling said first and second housing sections, said flash unit and said bellows with each other in such a manner that said first and second housing sections, said flash unit and said bellows are movable to their respective positions in cooperation with each other, said coupling means being operatively coupled with said switch means to turn on said switch means when said flash unit moves to said operative position thereof in response to the movement of said first and second housing sections to said extended position and to turn off said switch means when said flash unit moves to said inactive position thereof in response to the movement of said first and second housing means to said compact folded position thereof.

16. A camera according to claim 15, wherein said connecting means includes a first coupling means for guiding said first and second housing sections in shifting their positions and, at the same time, for shifting the position of said bellows and a second coupling means which effects the shifting of the position of said flash unit in response to the operation of said first coupling means; said first coupling means being pivotally coupled with said first housing section at one end thereof and with said second housing sections at the other end thereof; and said second coupling means being pivotally coupled with said flash unit at one end thereof and with said first coupling means at the other end thereof.

17. A camera according to claim 16, wherein said first coupling means has a first movable member one end of which is pivotally coupled with said first housing section and a second movable member which is pivotally coupled with said second housing section; and the other end of said first movable member is pivotally coupled with the other end of said second movable member.

18. A camera according to claim 16, wherein said second coupling means is provided with first urging means which constantly urges said flash unit to rotate toward said inactive position thereof; and said first coupling means is provided with a second urging means which constantly urges said first and second housing sections to move to said extended position, said first urging means being arranged to have a weaker urging force than said second urging means.

19. A camera according to claim 15, wherein said coupling means has a cover member which covers said second housing section and forms a portion of the external wall of said first housing section when said first and second housing sections are set in said compact folded position.

20. A folding camera for using a film unit containing a developing element and a sheet of light sensitive material on which a visible image is formed after treatment by a processing solution provided in a containing means after exposure, comprising:

(a) supply circuit means connectable to a power source for the camera;

(b) a housing including first and second housing sections mounted for relative movement between a compact folded position and an extended position wherein said first and second housing sections define a space therebetween, said first housing section being provided with a recession on the external wall thereof;

(c) means provided in said first housing section for locating a film unit in position for exposure;

(d) exposure means including optical means for exposing said film unit located at said exposure position, said optical means including an objective lens mounted on said second housing section for transmitting an image-bearing light along an optical path within said space defined between said housing sections in their extended position;

(e) feed means for advancing the sensitive material after exposure, processing the exposed sensitive material with the processing solution during the advancement and carrying the processed sensitive material out of the first housing section, said feed means having a motor driven with a current from the power source circuit means;

(f) flash unit responsive switch means;

(g) a flash unit electrically connected to said power source circuit through said switch means, said flash unit containing flash tube means therein, said flash unit being pivotally coupled with said housing in such a manner as to be shiftable between an operative position in which the flash unit protrudes out of said recession to permit operation thereof and an inactive position in which the flash unit is placed within said recess in an inoperative state, a portion of the external wall of said first housing section being formed by at least a portion of said flash unit when the flash unit is placed in said recess of said first housing section;

(h) a collapsible and expandable bellows formed of a flexible, light-opaque material, said bellows being coupled to said first and second housing sections for shifting therewith to a compact collapsed position as said first and second housing sections shift to said folded position and to an expanded position as said first and second housing sections shift to said extended position, in which said expanded bellows defines light blocking walls within said space for excluding extraneous light coming through said optical path; and (i) connecting means for operatively coupling said first and second housing sections, said flash unit and said bellows with each other in such a manner that said first and second housing sections, said flash unit and said bellows are movable to their respective positions in cooperation with each other, said coupling means being operatively coupled with said switch means to turn on said switch means when said flash unit moves to said operative position thereof in response to the movement of said first and second housing sections to said extended position and to turn off said switch means when said flash unit moves to said inactive position thereof in response to the movement of said first and second housing means to said compact folded position thereof.

21. A camera according to claim 20, wherein said coupling means includes a first connecting means for guiding said first and second housing sections in shifting their positions and, at the same time, for shifting the position of said bellows and a second coupling means which effects the shifting of the position of said flash unit in response to the operation of said first coupling means; said first coupling means being pivotally coupled with said first housing section at one end thereof and with said second housing sections at the other end thereof; and said second coupling means being pivotally coupled with said flash unit at one end thereof and with said first coupling means at the other end thereof.

22. A camera according to claim 21, wherein said first coupling means has a first movable member one end of which is pivotally coupled with said first housing section and a second movable member which is pivotally coupled with said second housing section; and the other end of said first movable member is pivotally coupled with the other end of said second movable member.

23. A camera according to claim 21, wherein said second coupling means is provided with first urging means which constantly urges said flash unit to rotate toward said inactive position thereof; and said first coupling means is provided with a second urging means which constantly urges said first and second housing sections to move to said extended position, said first urging means being arranged to have a weaker urging force than said second urging means.

24. A folding camera device in accordance with claim 20, wherein the first housing sections including a means for prohibiting current to the flash unit from the supply circuit when the feed means is in operation.

25. A folding camera device in accordance with claim 20, wherein the first housing sections including a means for stopping the driving of the feed means when the outlet of the first housing section through which the sensitive material is carried out is covered with the hand of the photographer.

26. A folding camera for using a film unit containing a developing element and a sheet of light sensitive material on which a visible image is formed after treatment by a processing solution contained in containing means after exposure, comprising:

(a) circuit means connectable to a power source for the camera;

(b) a housing including first and second housing sections mounted for relative movement between a compact folded position and an extended position wherein said first and second housing sections define a space therebetween, said first housing section having a recess on the external wall thereof;

(c) means provided in said first housing section for locating a film unit in position for exposure;

(d) exposure means provided in said second housing section including:
  optical means for exposing the film unit located at said exposure position, said optical means having an objective lens for transmitting image-bearing light along an optical path within said space defined between said housing sections in said extended position, and
  shutter means for selectively permitting said optical means to expose said film unit;

(e) switch means to be closed with the shutter means after the operation of the shutter means;

(f) feed means provided in said first housing section for advancing the film unit after exposure, processing the exposed film unit with the processing element during the advancement and carrying the processed film unit out of a first device, said feed means including a motor driven with a current from the power source circuit;

(g) first switch means provided between the motor and the circuit, the first switch means being arranged to detect the extent of a film advance by said feed means when the feed means has carried out a predetermined amount of work and then to interrupt the current supply to the motor from the power source circuit;

(h) a flash unit containing flash tube means, said flash unit being pivotally coupled with said housing to be shiftable between an operating position in which it protrudes out of said recess to permit operation thereof and an inactive position in which it is placed inside said recess in an inoperative state, at least a portion of said flash unit forming a portion of the external wall of said first housing section when said flash unit is positioned inside the recess;

(i) a collapsible and expandable bellows formed of a flexible, light-opaque material, said bellows being coupled to said first and second housing sections for shifting therewith to a compact collapsed position as said first and second housing sections shift to said folded position and to an expanded position as said first and second housing sections shift to said expanded position, in which said erected bellows defines light blocking walls within said space for excluding extraneous light coming through said optical path;

(j) flash unit switch means between said circuit and said flash unit, the unit switch means being closed in response to the movement of said flash unit to said operating position thereof;

(k) means for prohibiting current supply to the flash unit until the first switch means is opened; and (l) connecting means for operatively coupling said first and second housing sections, said flash unit and said bellows with each other in such a manner that said first and second housing sections, said flash unit and said bellows are movable to their respective positions in cooperation with each other.

27. A folding camera device in accordance with claim 26, wherein the first device includes an outlet and stop means for stopping the drive of the feed means when the outlet of the first housing section through which the film unit is passed by the feed means is covered by the hand of the photographer.

28. A camera according to claim 26, wherein said connecting means includes a first coupling means for guiding said first and second housing sections in shifting their positions and, at the same time, for shifting the position of said bellows and a second coupling means which effects the shifting of the position of said flash unit in response to the operation of said first coupling means; said first coupling means being pivotally coupled with said first housing section at one end thereof and with said second housing sections at the other end thereof; and said second coupling means being pivotally coupled with said flash unit at one end thereof and with said first coupling means at the other end thereof.

29. A camera according to claim 28, wherein said first coupling means has a first movable member one end of which is pivotally coupled with said first housing section and a second movable member which is pivotally coupled with said second housing section; and the other end of said first movable member is pivotally coupled with the other end of said second movable member.

30. A camera according to claim 28, wherein said second coupling means includes first urging means which constantly urges said flash unit to rotate toward said inactive position thereof; and said first coupling means includes a second urging means which constantly urges said first and second housing sections to move to said extended position, said first urging means being arranged to have a weaker urging force than said second urging means.

31. A camera according to claim 26, wherein said coupling means has a cover member which covers said second housing section and forms a portion of the external wall of said first housing section when said first and second housing sections are set in said compact folded position.

* * * * *